United States Patent Office 3,119,832
Patented Jan. 28, 1964

---

3,119,832
CERTAIN 2-ARYL-4-ISOXAZOLINE-3-ONES AND THEIR PRODUCTION
Max Matter, Muri, Christian Vogel, Berne, and René Bosshard, Gumligen, Switzerland, assignors to Haco A.G., Gumligen, Switzerland, a Swiss company
No Drawing. Filed Mar. 8, 1961, Ser. No. 94,152
Claims priority, application Switzerland Mar. 9, 1960
12 Claims. (Cl. 260—307)

4-isoxazoline-3-ones containing a substituent on the nitrogen atom have not previously been described in prior art.

The present invention, therefore, primarily refers to new N-substituted 4-isoxazoline-3-ones having the general formula

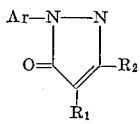

wherein Ar means an unsubstituted phenyl radical or a phenyl radical substituted by at least one lower alkyl or alkoxy group, $R_1$ means hydrogen or a lower alkyl radical with at most 6 carbon atoms and $R_2$ means a lower alkyl radical with at most 6 carbon atoms or a phenyl radical.

Moreover, the present invention comprises a method for the preparation of new N-substituted 4-isoxazoline-3-ones having the general formula

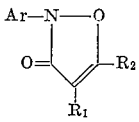

wherein Ar means an unsubstituted phenyl radical or a phenyl radical substituted by at least one lower alkyl or alkoxy group, $R_1$ means hydrogen or a lower alkyl radical with at most 6 carbon atoms and $R_2$ means a lower alkyl radical with at most 6 carbon atoms or a phenyl radical by condensing intramolecularly a hydroxamic acid of the general formula

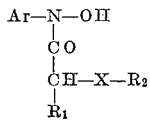

wherein Ar, $R_1$ and $R_2$ have the above meanings and X means a keto or ketal group, in the presence of acidic condensing agents.

The said condensation step is preferably carried out in the presence of solvents and in the absence of water. Suitable solvents for this purpose include aliphatic and heterocyclic ethers, like for example, dimethyl ether, diethyl ether, di-isopropyl ether, tetrahydrofuran and dioxane, as well as carboxylic acids such as, for example, glacial acetic acid, formic acid and trichloroacetic acid. The condensation can, however, also be performed in other inert solvents, e.g. chloroform. As condensing agents, acids of the most various kind, particularly Lewis acids, can be used, such as concentrated sulphuric acid, polyphosphoric acid and tin tetrachloride. Acidic adducts, e.g. the addition product of sulphur trioxide with dioxane, boron/trifluoride etherate, chlorosulfonic acid etherate and zinc chloride-hydrochloric acid are very suitable as condensing agents.

Furthermore, the present invention relates to new N-substituted hydroxamic acids of the general formula

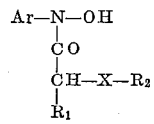

wherein Ar, $R_1$, $R_2$ and X have the above meanings. The same are obtained by methods known in themselves, as will ensue from the following examples.

The ring closure which takes place by the condensation step according to the invention occurs not only by using β-keto hydroxamic acids, but also when using the corresponding ketals, that is to say β-keto hydroxamic acids in which the keto group is masked by a ketal group. This procedure is suitable in those cases in which the β-keto hydroxamic acid is most easily available by way of the corresponding ketal. As ketals for the process according to the invention, there may be used e.g. dimethyl ketal, diethyl ketal, dibutyl ketal and more particularly ethylene ketal and propylene ketal.

The new 4-isoxazoline-3-ones of the present invention may be used as intermediate products for the preparation of new synthetic compounds useful for therapeutic purposes. Moreover, they also possess themselves valuable pharmacological properties, the analgesic-antiphlogistic activity being particularly marked. They are thus particularly valuable medicines for rheumatic therapy. In clinical tests 2-phenyl-5-methyl-4-isoxazoline-3-one has, for instance, proved to be of particular medicinal value in the exacerbation of chronic degenerative diseases such as spondylarthrosis and gonarthrosis because, beside showing an excellent therapeutical activity, it has substantially no undesired secondary effects.

The new 4-isoxazoline-3-ones of the present invention can be used as medicines for instance in the form of pharmaceutical compositions which contain the new active substances in admixture with a pharmaceutical, organic or inorganic carrier, solvent or diluent suitable for enteric, parenteral or topical application. As carrier or diluent may be used materials such as, for instance, water, gelatine, lactose, starch, magnesium stearate, talcum, vegetable oils, benzyl alcohols, gum, polyalkylene glycols, Vaseline, cholesterol or other known medicinal carriers. The new pharmaceutical compositions may, for instance, be in the form of tablets, dragees, ointments, cremes or in liquid form as solutions, suspensions or emulsions. They may also be sterilized and/or may contain auxiliary materials such as preservatives, stabilizers, emulsifiers, wetting agents, salts by modifying the osmotic pressure and buffers. Moreover, they may contain additional therapeutically valuable products such as local anesthetics. The new compositions can be produced by methods known in themselves.

The invention is illustrated but not limited by the following examples; the temperatures are given in Celsius.

*Example 1*

While stirring and under exclusion of moisture, 60 g. of boron trifluoride etherate are gradually added to a suspension of 39 g. of N-phenyl-acetoacethydroxamic acid in 400 ml. of absolute ether at 0–5° (ice bath cooling). A clear solution results in which crystals form fairly rapidly. The solution is stirred for 1½ hours and then left to stand for about 20 hours at 0–3°. The precipitated complex of the formula: $C_{10}H_9NO_2 \cdot BF_3$ can be crushed, filtered off, washed with a small volume of absolute ether and decomposed by addition of iced water. The whole reaction mass containing the complex can also be poured onto ca. 300 g. of a mixture of ice and water which contains 120 g. of dissolved anhydrous sodium acetate. The whole is mixed thoroughly with 100 ml. of chloroform, the aqueous layer is separated and extracted with 100 ml. of ether. The combined organic layers are shaken twice rapidly and violently each time with 100 ml. of cold 2-n-sodium hydroxide solution, to remove the uncyclised hydroxamic acid. It is then washed with 100 ml. of water, thereafter with 50 ml. of saturated sodium hydrogen carbonate solution, dried with sodium sulfate and evaporated. The clear, oily residue weighs 23 g. and consists of raw 2-phenyl-5-methyl-4-isoxazoline-3-one.

In order to purify the residue it can be taken up in an equal quantity of warm benzene, filtered and cooled to 0°, whereupon such an amount of petroleum ether is added that a second layer begins to precipitate. This mixture is crystallized by cooling to ca. −20°. Gradually more petroleum ether is added, the temperature being maintained at −15 to −20°, until a total of ca. 400 ml. thereof has been added. The crystals are filtered off, washed with a small amount of petroleum ether and dried in vacuo at ca. 20°; in this manner 21 g. of colorless crystals are obtained, having a melting point of 33–36°. To purify further, the said crystals may be dissolved in benzene and filtered through a column of 20 g. of aluminum oxide of activity I or re-crystallized from a mixture of methanol and water, while adding animal charcoal. The pure compound melts at 35–36°. Small quantities may be distilled in high vacuo without decomposition, $B.P._{0.05}$ ca. 110°. At temperatures above ca. 160°, however, the new compound is converted into an isomer melting at 91°.

For medicinal, parenteral application the new compound can be used dissolved in the 10-fold quantity of a mixture of propylene glycol and water in the ratio of 1:1.

Instead of 60 g. of boron trifluoride etherate there may be used as condensing agent, for example, a mixture of 23.4 g. of chlorosulfonic acid and 100 ml. of absolute ether. Before performing the condensation, the chlorosulfonic acid is gradually mixed into the well cooled, absolute ether.

The hydroxamic acid used as starting product can be obtained in the following manner:

21.8 g. of N-phenyl hydroxylamine are stirred into 100 ml. of absolute benzene and 70 ml. of absolute ether containing a drop of pyridine, under exclusion of moisture. In the course of one hour a solution of 17 g. of diketone in 20 ml. of absolute benzene is added at ca. 0–5°. The solution is then left to stand over night at 0°. By filtering off the crystalline precipitate by suction and washing with cold benzene, 25 g. of pure N-phenyl-acetoacethydroxamic acid are obtained in the form of colorless crystals which melt at 124–125°. An alcoholic solution of the new compound is colored an intense red by the addition of ferric chloride.

The same hydroxamic acid can also be prepared from the potassium salt of acetoacetic acid ethylene ketal by converting this latter in the cold with oxalyl chloride into acetoacetic acid chloride-ethylene ketal and adding the same in absolute ether at 0° to two equivalents of N-phenyl hydroxylamine.

The N-phenyl acetoacethydroxamic acid-ethylene ketal can then be hydrolyzed in an acid medium to form the N-phenyl acetoacethydroxamic acid or be intramolecularly condensed directly with 3 moles of boron trifluoride etherate to obtain 2-phenyl-5-methyl-4-isoxazoline-3-one.

*Example 2*

3 g. of N-phenyl acetoacethydroxamic acid are added, while stirring and at 8–10° to a mixture of 60 g. of glacial acetic acid saturated with gaseous hydrochloric acid and 4.5 g. of anhydrous zinc chloride. After one hour a few crystals have precipitated. The mixture is poured onto a mixture of about 300 g. of ice and water and mixed with 200 ml. of ether and 30 ml. of chloroform. After separating off the aqueous layer, the mixture is washed acid-free with a 2n-sodium hydroxide solution and is further worked up as in Example 1. 1.5 g. of pure 2-phenyl-5-methyl-4-isoxazoline-3-one are thus obtained.

*Example 3*

10 g. of N-(p-tolyl)-acetoacethydroxamic acid are cyclized in 300 ml. of absolute ether according to the method described in Example 1 with 13.7 g. of boron trifluoride etherate. After purifying the benzene solution of the raw product with aluminum oxide and re-crystallizing from a mixture of benzene and petroleum ether, 2-(p-tolyl)-5-methyl-4-isoxazoline-3-one is obtained which melts at 56.5–57.5°.

The hydroxamic acid used as starting product is obtained from p-tolyl hydroxylamine in the manner described in Example 1 by acylating with diketene; it melts at 120–121.5°.

*Example 4*

4.5 g. of N-(m-methoxy phenyl)-acetoacethydroxamic acid are cyclized with 5.7 g. of boron trifluoride etherate according to the method of Example 1. After re-crystallizing from benzene and petroleum ether and filtering the benzene solution over aluminum oxide, there is obtained from the raw product 2-(m-methoxy phenyl)-5-methyl-4-isoxazoline-3-one in the form of colorless crystals melting at 98°.

The N-(m-methoxy phenyl)-acetoacethydroxamic acid melting at 99° is obtained from m-methoxy phenyl hydroxylamine and diketene as in Example 1.

The m-methoxy phenyl hydroxylamine does not constitute a stable compound so that it must be prepared fresh each time for the conversion into the hydroxamic acid. It can be prepared from n-nitroanisol according to the conventional reduction method with ammonium chloride and zinc powder in water; however, the temperature is not allowed to rise above 55–60°. It is crystallizable from a mixture of water and ethanol at −10 to −20°, as well as from a mixture of ether and petroleum ether. Because of instability the melting point is unsharp and lies at approximately 50°. The working up and purifying must be performed as far as possible under exclusion of air oxygen, for instance in a nitrogen atmosphere.

*Example 5*

7.5 g. of N-phenyl-α-methyl-β-oxo-valerhydroxamic acid are cyclized by one of the methods described in Examples 1 and 2. 6.2 g. of the raw product are obtained in the form of a colorless oil. For purification the oil can be taken up in benzene and percolated through an aluminum oxide column. Recrystallization from petroleum ether is also possible, if cooled to −20°. The pure 2-phenyl-4-methyl-5-ethyl-4-isoxazoline-3-one melts at 22–23° and can be distilled in high vacuo; $B.P._{0.02}$ about 105°. Once molten, the compound remains generally liquid and this even at a temperature considerably below room temperature; the refraction index is $n_D^{20} = 1.5656$.

The hydroxamic acid used as starting product is obtained in a similar manner as in Example 1 from dimeric methyl ketene and N-phenyl hydroxylamine. The dimeric methyl ketene can be prepared according to the process disclosed in U.S. Letters Patent 2,369,919 from propionyl chloride and triethylamine.

*Example 6*

6.1 g. of N-phenyl-α-butyl-β-oxo-caprylhydroxamic acid are cyclized according to one of the processes described in Examples 1 and 2. In this case the non-cyclized hydroxamic acid cannot be extracted with 2n-aqueous sodium hydroxide solution from the ethereal solution of the raw product, which is obtained as a colorless oil. Accordingly the starting hydroxamic acid is removed by percolating the benzene solution through an aluminum oxide column and eluating with a mixture of benzene and ethyl acetate in the ratio of 9:1. Pure 2-phenyl-4-(n-butyl)-5-(n-pentyl)-4-isoxazoline-3-one is thus obtained as a colorless oil with a refraction index of $n_D^{20}=1.5323$. As the new compound decomposes at higher temperatures, distillation in high vacuo is not appropriate.

The starting hydroxamic acid is obtained from N-phenyl hydroxylamine by acylating with dimeric n-butyl ketene in a mixture of ether and benzene in the ratio of 1:1, in the presence of catalytic quantities of pyridine. The raw hydroxamic acid can be crystallized from petroleum ether by cooling to ca. −80°. It melts at 49.5–51.5°.

Example 7

To the suspension of 4.43 g. of N-phenyl-α-isopropyl acetoacethydroxamic acid-ethylene ketal in 45 ml. of absolute ether is added dropwise at 0–5°, while stirring and under exclusion of moisture, 6.8 g. of boron trifluoride ethyl etherate. A clear solution first results which, upon continued stirring, becomes turbid again. The solution is stirred for one hour at 0° and thereupon left to stand over night at 0°. The reaction mixture is poured into a solution of 7.9 g. of sodium acetate in 50 ml. of ice water, the ethereal layer is separated and the aqueous solutions are shaken again with 20 ml. of ether. After washing the ethereal solution with 30 ml. of water, drying with sodium sulfate and evaporating in vacuo, a crystalline residue is obtained which, to purify, is filtered in a benzene solution through the tenfold quantity of aluminum oxide (act. I) and re-crystallized from methanol and water. In this manner 2.0 g. of pure 2-phenyl-4-isopropyl-5-methyl-4-isoxazoline-3-one are obtained which melt at 79–80°.

The condensation can also be carried out with chlorosulfonic acid in ether according to the process described in Example 1.

The starting product required for the synthesis of the new compound, i.e. N-phenyl-α-isopropyl acetoacethydroxamic acid-ethylene ketal can be prepared in the following way: 132.6 g. of α-isopropyl-acetoacetic acid ethyl ester are ketalized according to the conventional method with 52.7 g. of ethylene glycol and p-toluene-sulfonic acid as catalyst in 150 ml. of absolute benzene, by boiling the mixture for 10 hours in a water separator. In this manner 100.5 g. of α-isopropyl-acetoacetic acid ethyl ester-ethylene ketal, boiling at 111–113° (11 Torr), are obtained; $n_D^{20}=1.4397$. 52.7 g. of ketalized ester are dissolved in 200 ml. of methanol and added to a solution of 13.5 g. of potassium hydroxide in 50 ml. of water. To saponify the mixture it is heated for 16 hours in an autoclave at 110°. After evaporation of the methanol in vacuo, the residue is diluted in 50 ml. of water and the aqueous layer is covered with 200 ml. of ether. Then 2n-hydrochloric acid is added dropwise until neutral to methyl orange, a thorough stirring and cooling with an iced water bath being required during this operation step. The separated aqueous phase is twice extracted, each time with 100 ml. of ether, the combined ethereal solutions are dried with sodium sulfate and evaporated in vacuo at room temperature. The residue is distilled in high vacuo. It is advisable to perform the distillation in two portions as decomposition may easily occur. The α-isopropyl-acetoacetic acid ethylene ketal distills over at 119–123° (1 Torr) as a viscous oil which soon solidifies; for further purification it is re-crystallized from a small volume of petroleum ether. 11 g. of the pure acid melting at 59–60° are hereby obtained.

4.7 g. of the above acid are dissolved in 20 ml. of absolute ether and 2 ml. of absolute pyridine to which are added dropwise, while stirring well and under exclusion of moisture, a solution of 3.18 g. of freshly distilled oxalyl chloride in 5 ml. of absolute ether. The mixture is subsequently stirred for one hour at room temperature and boiled for one hour under reflux. After filtering off by suction the resultant pyridine hydrochloride and rinsing the remaining portion with 20 ml. of ether, the ethereal solution containing the α-isopropyl-acetoacetic acid chloride ethylene ketal is added dropwise, under exclusion of moisture, to a stirred solution of 5.45 g. of phenyl hydroxylamine in 50 ml. of absolute ether cooled to −10° and the reaction mixture is left to stand overnight at 0°. By filtering off the crystalline precipitate by suction and washing with a large volume of water, 3.7 g. of raw N-phenyl-α-isopropyl-acetoacethydroxamic acid ethylene ketal are obtained, which can be purified by recrystallizing from a mixture of methanol and water; it then melts at 121–123°. By evaporating the ethereal filtrate after being washed successively with 1n-hydrochloric acid, water and a saturated sodium hydrogen carbonate solution, a further portion of the new compound can be obtained.

Example 8

3.57 g. of N-phenyl-benzoyl-acethydroxamic acid ethylene ketal are cyclized in 100 ml. of absolute ether with the threefold molar quantity of boron trifluoride-ethyl etherate according to the method described in Example 7. The raw product is filtered in a benzene solution through the tenfold quantity of aluminum oxide (activity I) and the eluate is recrystallized from a mixture of ethyl acetate and petroleum ether. 2.0 g. of pure 2:5-diphenyl-4-isoxazoline-3-one, melting at 86–87°, are thereby obtained.

The hydroxamic acid used as starting material can be synthesized by the following steps: 48 g. of benzoyl acetic acid ethyl ester, 18 g. of ethylene glycol and 150 ml. of benzene are boiled under reflux together with a catalytic quantity of p-toluene sulfonic acid for 15 hours using a water separator. The distillation of the raw product provides 34.4 g. of benzoyl acetic acid ethyl ester ethylene ketal, boiling at 106–108° (0.02 Torr). In order to hydrolyze the resulting product 6.7 g. of potassium hydroxide in 30 ml. of water are added to the solution of 25.7 g. of ketalized ester in 120 ml. of methanol, and the whole is boiled for one hour under reflux. After working up in the conventional manner, 18.8 g. of raw benzoyl acetic acid ethylene ketal are obtained, which are purified by recrystallizing from a mixture of ether and petroleum ether. It then melts at 92–93°.

A mixture of 5.2 g. of the ketalized acid, 2.98 g. of thionyl chloride and 30 ml. of absolute ether are boiled for 2½ hours under reflux and exclusion of moisture. The solution is hereupon evaporated in vacuo at a bath temperature of 40°, the raw benzoyl acetic acid chloride ethylene ketal which remains as light yellow, viscous oil is taken up again in 20 ml. of absolute ether and the ethereal solution is slowly added dropwise under exclusion of moisture and at −10° to the stirred solution of 5.45 g. of N-phenyl hydroxylamine in 50 ml. of absolute ether. After being left to stand over night at 0°, the precipitate formed is filtered off by suction, washed with ether, treated with 50 ml. of iced water and again filtered by suction. 4.92 g. of raw N-phenyl-benzoyl acethydroxamic acid ethylene ketal are thus obtained. The pure substance, crystallizing from a mixture of ethylacetate and petroleum ether in felted needles, melts at 142–143°.

What we claim is:
1. An N-substituted 4-isoxazoline-3-one of the formula

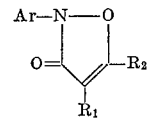

wherein Ar is a member selected from the group consisting of phenyl, lower alkylphenyl and lower alkoxyphenyl, $R_1$ is a member selected from the group consisting of H and alkyl with at most 6 carbon atoms, and $R_2$ is a member selected from the group consisting of alkyl with at most 6 carbon atoms and phenyl.

2. An N-substituted 4-isoxazoline-3-one of the formula

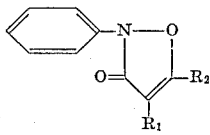

wherein $R_1$ is alkyl with at most six carbon atoms, and $R_2$ is alkyl with at most 6 carbon atoms.

3. An N-substituted 4-isoxazoline-3-one of the formula

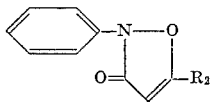

wherein $R_2$ is alkyl with at most 6 carbon atoms.

4. 2-phenyl-5-methyl-4-isoxazoline-3-one.
5. 2-phenyl-4-methyl-5-ethyl-4-isoxazoline-3-one.
6. 2-phenyl-4-isopropyl-5-methyl-4-isoxazoline-3-one.
7. 2-phenyl-4-n-butyl-5-n-pentyl-4-isoxazoline-3-one.
8. 2-p-tolyl-5-methyl-4-isoxazoline-3-one.
9. A process for preparing an N-substituted 4-isoxazoline-3-one of the formula

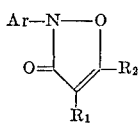

wherein Ar is a member selected from the group consisting of phenyl, lower alkylphenyl and lower alkoxyphenyl, $R_1$ is a member selected from the group consisting of H and alkyl with at most 6 carbon atoms, and $R_2$ is a member selected from the group consisting of alkyl with at most 6 carbon atoms and phenyl, which comprises the intramolecular condensation of a compound of the formula

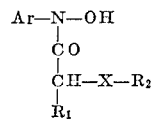

wherein Ar is the corresponding member selected from the group consisting of phenyl, lower alkylphenyl and lower alkoxyphenyl, $R_1$ is the corresponding member selected from the group consisting of H and alkyl with at most 6 carbon atoms, $R_2$ is the corresponding member selected from the group consisting of alkyl with at most 6 carbon atoms and phenyl, and X is a member selected from the group consisting of keto and ketal, in the presence of acidic condensing agent.

10. A process according to claim 9, wherein the acidic condensing agent is the addition product of chlorosulfonic acid and ether.

11. A process according to claim 9, wherein the acidic condensing agent is boron trifluoride etherate.

12. A process according to claim 9, wherein the acidic condensing agent is the addition product of hydrochloric acid and zinc chloride.

References Cited in the file of this patent

UNITED STATES PATENTS

| 2,279,560 | Dietrich | Apr. 14, 1942 |
| 2,279,973 | Dietrich | Apr. 14, 1942 |
| 2,397,508 | Rouault | Apr. 2, 1946 |
| 2,772,281 | Holly et al. | Nov. 27, 1956 |
| 2,845,432 | Kuehl | July 29, 1958 |
| 2,891,987 | Peck | June 23, 1959 |
| 2,929,836 | Carrara | Mar. 22, 1960 |